Nov. 22, 1966   D. R. TOMPKINS   3,287,632
MOBILE INSPECTION DEVICE FOR TESTING METALLIC MEMBERS FOR
LONGITUDINAL AND TRANSVERSE DISCONTINUITIES
Filed April 20, 1964   4 Sheets-Sheet 2

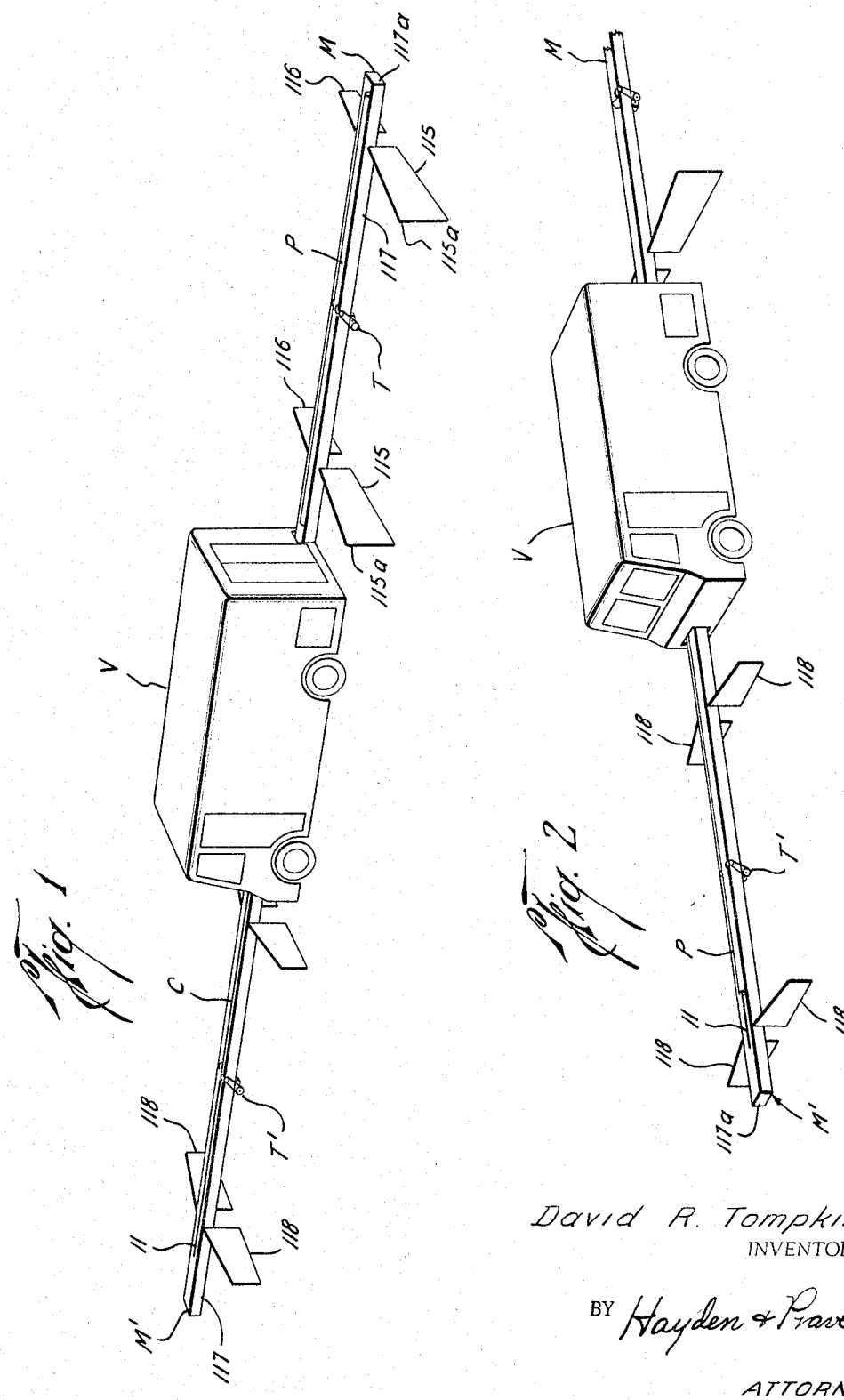

David R. Tompkins
INVENTOR.

BY Hayden & Pravel
ATTORNEYS

Nov. 22, 1966  D. R. TOMPKINS  3,287,632
MOBILE INSPECTION DEVICE FOR TESTING METALLIC MEMBERS FOR
LONGITUDINAL AND TRANSVERSE DISCONTINUITIES
Filed April 20, 1964  4 Sheets-Sheet 3
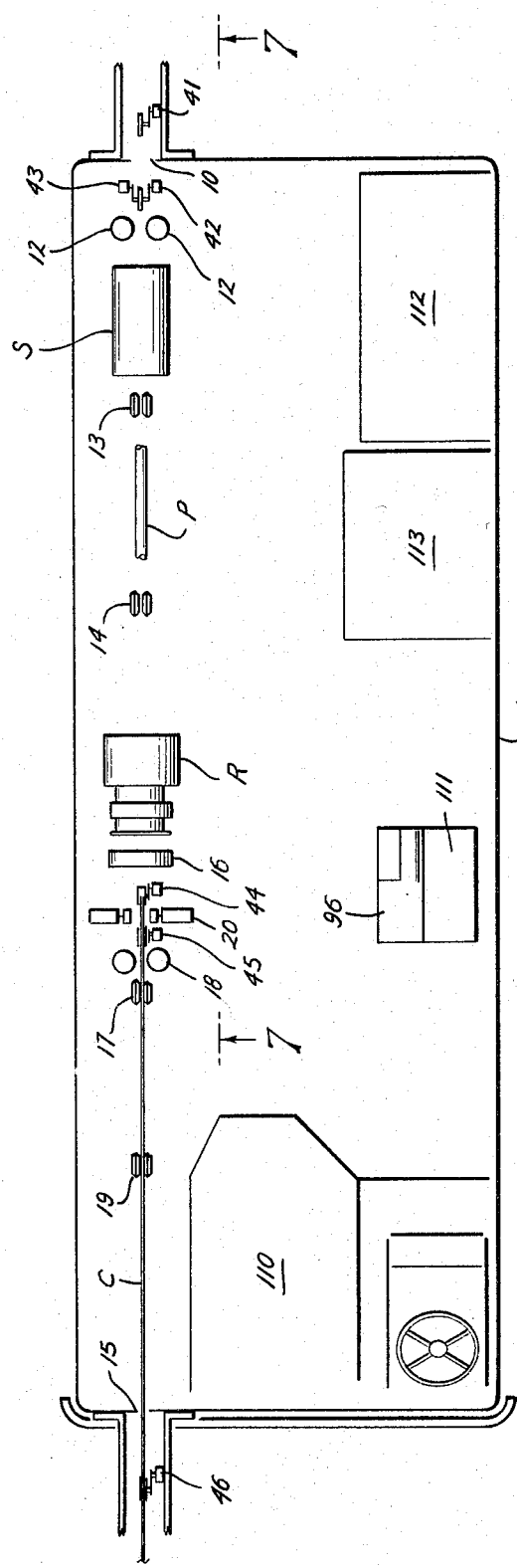
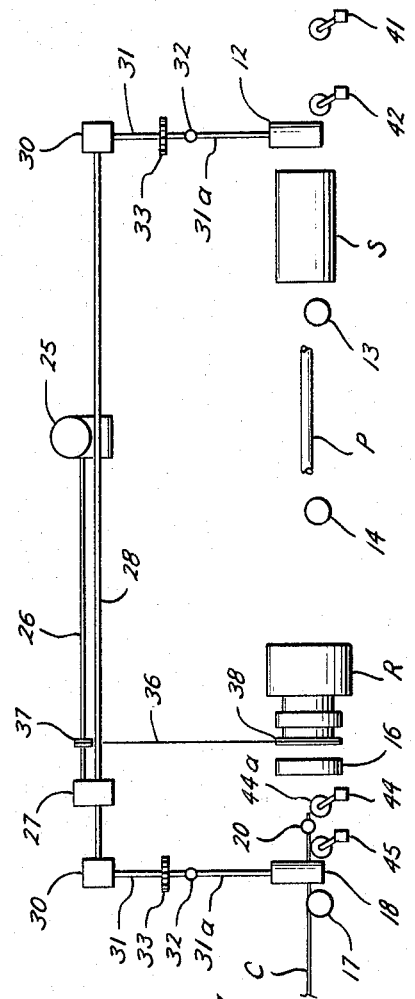
David R. Tompkins
INVENTOR.
BY Hayden & Pravel
ATTORNEYS

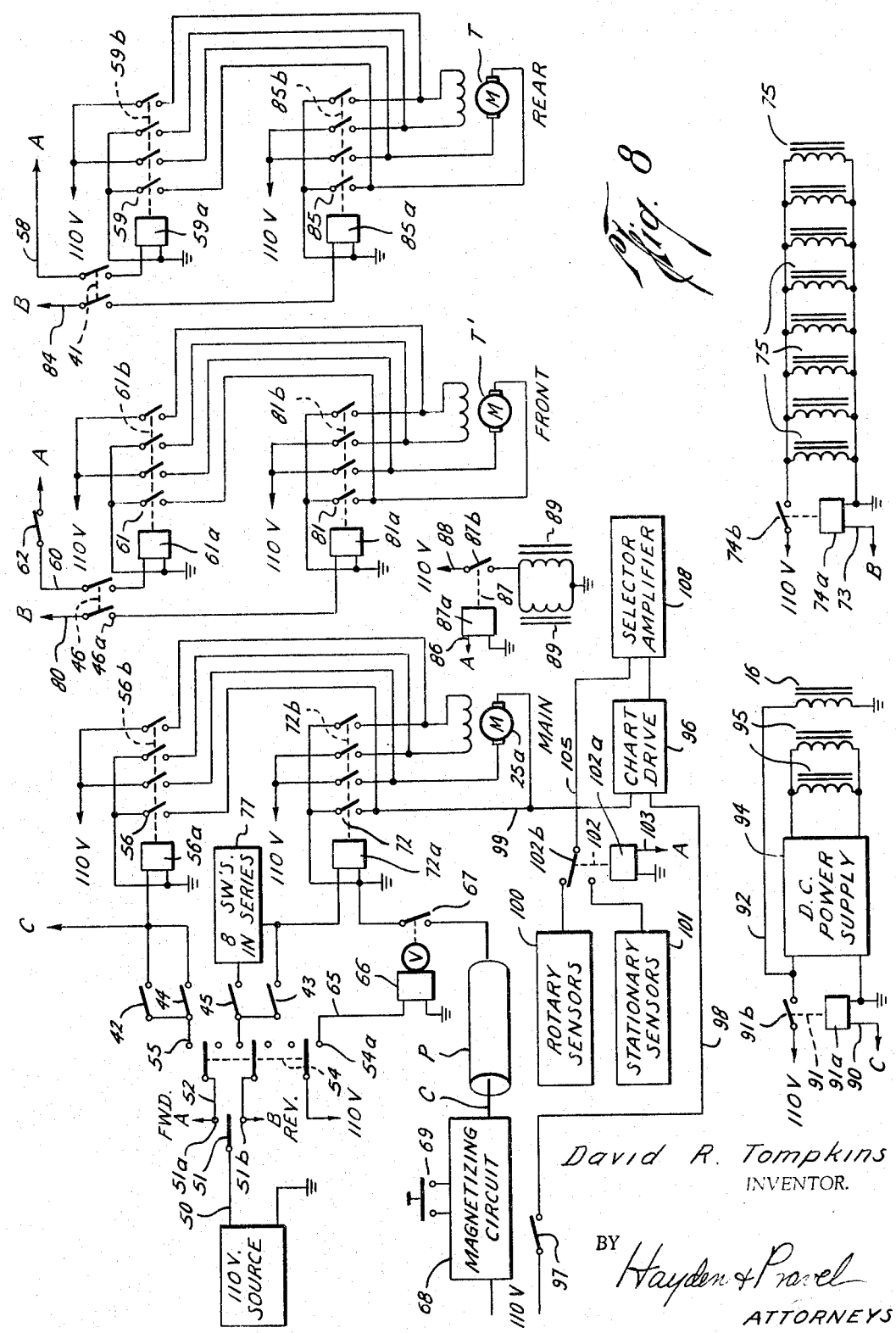

United States Patent Office 3,287,632
Patented Nov. 22, 1966

3,287,632
MOBILE INSPECTION DEVICE FOR TESTING METALLIC MEMBERS FOR LONGITUDINAL AND TRANSVERSE DISCONTINUITIES
David R. Tompkins, Houston, Tex., assignor to Plastic Applicators, Inc., a corporation of Texas
Filed Apr. 20, 1964, Ser. No. 360,947
2 Claims. (Cl. 324—37)

This invention relates to a method of magnetically inspecting longitudinally extending ferromagnetic objects and apparatus which is particularly adapted for use as a mobile inspection system which inspects tubular members automatically.

Structural members are often mass produced in accordance with calculations which control the strength thereof by dictating the physical size of the structural members. It is difficult to manufacture with unerring repetition a plurality of structural members from unshaped portions of homogeneous constituents without sometimes incorporating flaws or other discontinuities in the crystalline structure. Such flaws materially weaken the structural member to the extent that the member is often inadequate for the task for which it was designed. In other situations, members having structural integrity when new are often used and reused during which usage stresses and vibrations received thereby cause structure weakening fissures.

Considering oil field pipe as one example of a mass produced structural member which theoretically has adequate strength resulting from design criteria calculated to provide such strength, several sections of pipe having identical structure and size and presumably having equal strengths may be joined together wherein such uniformity enables one utilizing the several sections of pipe to rely on the structural integrity of the entire string when assembled. It has been recognized by many that the unexpected failure of oil field pipe or tubing often leads to cataclysmic results and the ensuing great economic loss and, as a result, the American Petroleum Institute has formulated standards defining the magnitude beyond which flaws are considered excessive and warrant rejection of the structural member as unsafe. Thus, oil field tubing or pipe which has flaws which extend as much as twelve and one-half percent of the wall thickness is considered unfit and is rejected on that basis.

At the present time, various types of inspection equipment are used on both newly manufactured structural members and on used members where such inspection is performed by magnetizing the member and sensing magnetic field variations thereabout. Oil field tubing and pipe is presently inspected by flowing current through a coil positioned about a tubular member, which current flow forms magnetic lines of flux through the opening of the coil which are intended to extend axially of the member under inspection. Additionally, current is often flowed axially of the tubular member to create flux circumferentially about the current path within the wall of the tubular member which orientates the flux lines perpendicular to longitudinally extending flaws. Heretofore, the inspection provided by inspection apparatus to which the present invention relates has been less than accurate and has been accomplished at some risk to the structural quality of the members and has generally been lacking in versatility.

The apparatus of this invention forms and applies magnetic flux in two directions relative to a tubular member separate and apart from one another to avoid interference and inaccurate data resulting from mingling and vector addition of the magnetic fields. The separate applications to flux to the tubular member results in time separation of the sensing of magnetic field variations by the various detection means so that the indicating and/or recording means sequentially indicates the results enabling one operator to have adequate time to read and examine all the data. The devices currently used form such a profusion of data that one man operation is difficult and prone to hasty and erroneous conclusions.

Pipe inspection apparatus of the type to which the invention relates consumes large amounts of electrical power and endangers the inspected goods by conducting large currents for relatively long periods of time through tubular members to create a great amount of heat which subjects the members to warping and other damage. Alternatively, other systems in present use form a transient surge of current which consumes less power but which increases the possibility of electrical spark or arcing which likewise endangers the member undergoing inspection by forming nicks or pits on the surface of the member. Such nicks or pits cause extensive damage to the member in forming holes in an internal plastic coating which is placed in oil field tubing and pipe to prevent chemical erosion during use, and those skilled in the art acknowledge that such plastic coatings are effective only to the extent that they are integral throughout the length of the member. Of considerable demerit is the fact that the devices presently used which pass a transient surge of current axially of a pipe require the use of D.C. and even A.C. biasing with their detection equipment because the transient surge does not form a properly shaped residual magnetic field.

Optimum inspection is achieved in magentic inspection systems when the greater dimension of a crystalline discontinuity is perpendicular to the magnetic lines of flux to maximize the number of interruped flux lines resulting in an increase in variations in the magnetic field exterior the structural member. Additionally, the amplitude of the signals formed by the detection means when passed through the magnetic field variations exterior the outer surface is increased by utilizing sensor means having its greater dimension parallel to the flaw when passed or moved relatively through the magnetic field variations to form maximum voltage amplitudes in the sensor means resulting from maximized intersection with the magnetic field variations. Certain devices presently used include apparatus which is encompassed about and strapped to a tubular member to position the sensors adjacent the outer surface of the member to achieve optimum detection sensitivity. The strapped on apparatus is connected by long lead wires to appropriate recording devices which record data sensed by the apparatus as it moves the length of the member to inspect the member. Such devices are limited in that hand or manual operation is required to remove and attach the openable portion to inspect several members and this limitation is particularly severe due to the fact that oil field pipe and tubing universally has internally threaded flanges or upsets at each end which prevent the pipe from feeding through the apparatus on completion of inspection. The clamping of the apparatus centers the pipe relative to the detection apparatus as a further requirement preliminary to proper inspection. The apparatus of this invention automatically feeds a number of elongate objects through the detector means without hand manipulation or operation preliminary to inspection and without requiring initial centralization of the pipe relative to the inspection device. Additionally, the apparatus inspects bent or crooked tubing in addition to flanged members so that the apparatus is not limited to use with items having uniform cylindrical shape. Thus, the invention provides means which automatically inspects any number of misshapen or irregular objects without hand or manual operations.

An object of this invention is to provide a new and improved method and apparatus for inspecting tubular members for flaws, voids, pits, and other structural flaws.

Yet another object of this invention is to provide new and improved mobile magnetic pipe inspection equipment which inspects pipe and other tubular members having flanges, upsets, bends, crooks, and other such departures from uniform cylindrical shape.

A further object of this invention is to provide inspection equipment which is mounted in a van or other vehicle for mobility and which provides all weather protection for the inspection equipment.

An additional object of this invention is to provide a new and improved inspection sequences utilizing apparatus which automatically performs certain inspection sequences wherein said sequences include an intermediate halt of the inspection operation to permit operator evaluation of data accumulated prior to the intermediate halt.

Still a further object of this invention is to provide a new and improved pipe inspection apparatus which automatically feeds consecutive tubular members through the apparatus without initial centralization of the members relative to the inspection equipment.

An important object of this invention is to provide a new and improved pipe inspection system which does not require hand or manual preparation of the equipment.

Yet a further object of this invention is to provide a new and improved pipe inspection apparatus having a minimum of read-out equipment to permit more thorough examination of the sensed data and more accurate evaluation thereof.

An important object of this invention is to provide a mobile pipe inspection apparatus which inspects both new and used pipe and other tubular members without requiring alteration or modification.

An additional object of this invention is to provide a new and improved tubular member inspection sequence so arranged as to permit one man evaluation and interpretation of recorded data.

Other objects and advantages of the present invention will become readily apparent from a consideration of the following description and drawings wherein:

FIG. 1 is a perspective view of a van type vehicle which is adapted to contain the inspection equipment of this invention and illustrating the relationship of the truck with pipe loading apparatus;

FIG. 2 is a front perspective view similar to FIG. 1 illustrating the forward portion of the pipe inspection apparatus in relation to a tubular member undergoing inspection;

Figure 3:
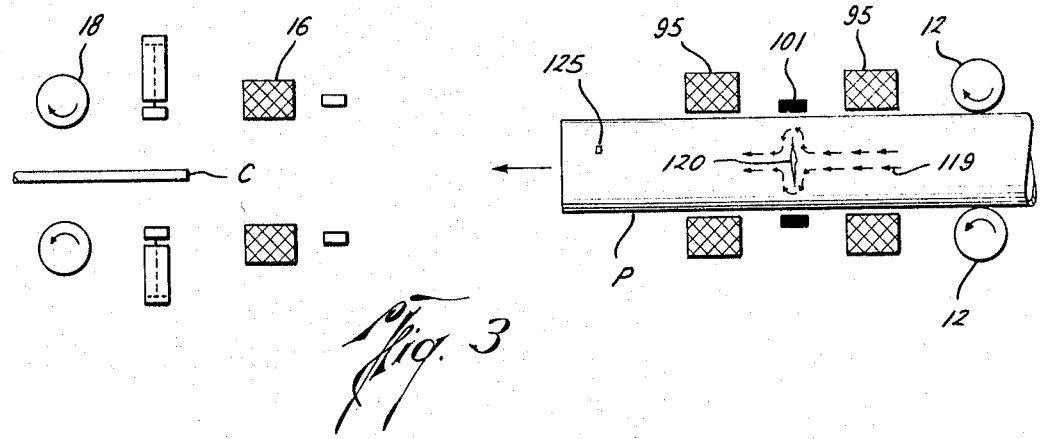
Figure 4:
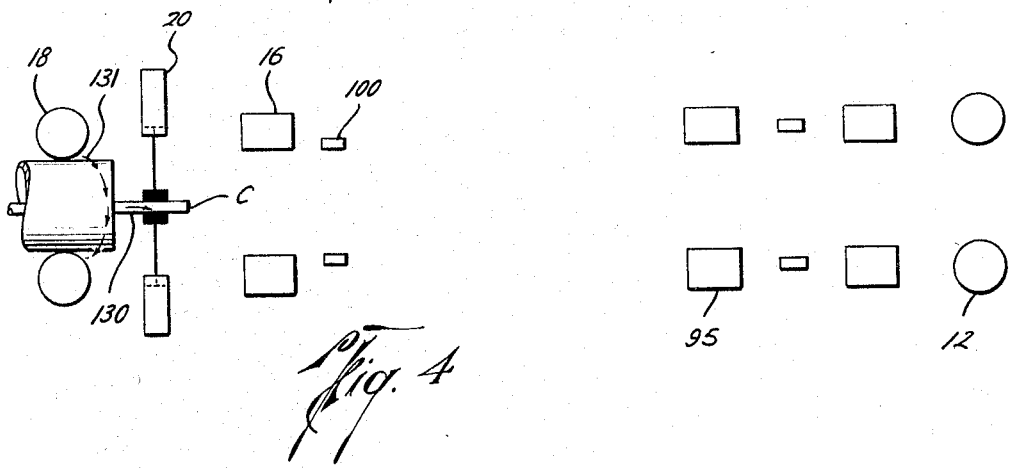
Figure 5:
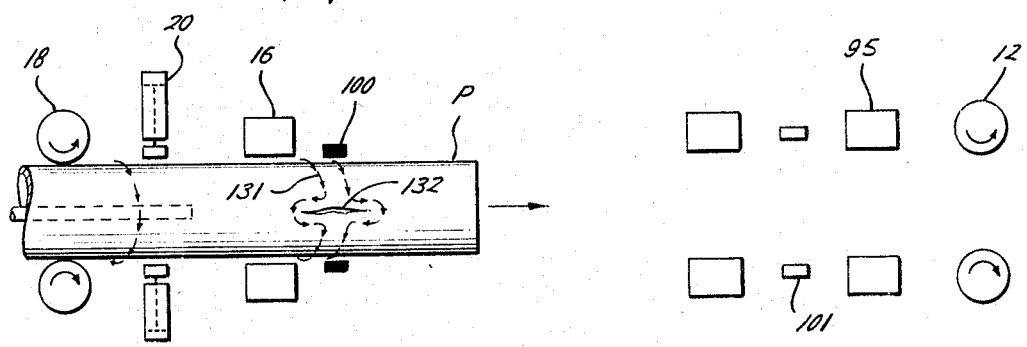

FIGS. 3, 4, and 5 illustrate one sequence of operation of the inspection equipment of this invention as a tubular member is translated through the equipment;

FIG. 6 is a schematic representation of the inspection apparatus aligned to inspect a tubular member as it moves through the apparatus of this invention and relating the apparatus to the van type vehicle;

FIG. 7 is a sectional view taken along the line 7—7 of FIG. 6 disclosing the drive system used for operation of the inspection equipment; and FIG. 8 is a schematic wiring diagram of the control system used to operate the inspection apparatus of this invention.

Broadly, this invention relates to a method of sequentially magnetizing and inspecting tubular members for flaws, seams, voids, and other structural anomalies. The apparatus for performing the method is preferably mounted in a van type vehicle V such as shown in FIGS. 1 and 2 and rack means M and M' are attached in line to the rear and front ends of the van, respectively. Electric motors for translating a tubular member such as the pipe P longitudinally of the rack means M and M' are indicated by the letters T and T', respectively, on each of the rack means M and M'. The pipe P is translated through the van V by passing through the rear of the truck where a stationary inspection head S inspects the pipe P for circumferentially extending flaws. The pipe P is then translated through the van V onto the rack means M' to angage an axially centered conductor C which is positioned in the pipe P by the motion of the pipe. The conductor C conducts a surge of current longitudinally of the pipe P to form a residual magnetic field in the wall of the pipe P which is thereafter scanned for longitudinally extending flaws by a rotating inspection head R as the pipe P is moved back through the van V to the rack means M. On return of the pipe P to the rack M, the inspection process is completed and the apparatus is prepared for inspection of additional tubular members.

The individual components of the inspection apparatus are described in the following copending applications assigned to the assignee of the present invention:

| Serial No. | Inventor | Filing Date |
|---|---|---|
| 1 ..... 329,084 | Lemuel L. Council_____ | December 9, 1963. |
| 2 ..... 1 325,064 | David R. Tompkins et al___ | November 20, 1963. |
| 3 ..... 348,662 | Lemuel L. Council_____ | March 2, 1964. |
| 4 ..... 347,456 | John T. Heinrichs et al_____ | February 26, 1964. |
| 5 ..... 348,047 | David R. Tompkins et al___ | February 28, 1964. |
| 6 ..... 402,551 | James Derwin King_____ | October 8, 1964. |
| 7 ..... 346,658 | David R. Tompkins et al___ | February 24, 1964. |
| 8 ..... 2 360,898 | Thomas R. McClughan_____ | April 20, 1964. |
| 9 ..... 264,254 | Dave D. Nagel et al_____ | March 11, 1963. |

1 Now Patent No. 3,255,381.
2 Now Patent No. 3,250,404.

Considering the invention more in detail, the van V provides 18 to 20 feet of unobstructed interior space between the front and rear walls and beneath the roof for all weather protection for installation of the apparatus of this invention which is rested on the floor of the van and secured to the right wall for stability and support. Examining first the apparatus arranged along the path of the pipe P, the pipe P is conducted or moved longitudinally of the rear rack M through an opening 10 in the rear of the truck where the forwardmost end of the pipe P engages a pair of oppositely rotating drive rollers 12. The drive rollers 12 rotate to urge the pipe P through an axial opening in the stationary inspection head S so that the pipe P emerges from the stationary inspection head S at the opposite end to rest upon a pair of free-wheeling guide wheels 13. The stationary inspection head S includes a pair of spaced apart coils which, when supplied with unidirectional current, cooperate together to form lines of magnetic flux longitudinally in a substantial portion of the pipe P which is passed through the openings of the coils. The stationary inspection head S additionally includes inductive sensor means such as those described in copending patent application Serial No. 264,254 which are carried against the outer surface of the pipe P by sensor mounting arm assemblies as described in copending application for patent Serial No. 347,456 to sense magnetic field variations exterior the outer surface of the pipe P which evidence internal structural flaws, voids, and other structural anomalies extending circumferentially about the pipe P. The internal construction of the stationary inspection head S is more fully disclosed in copending patent application Serial No. 348,047.

The tangential driving force applied by the drive rollers 12 to the outer surface of the pipe P urges the leading edge of the pipe P over a pair of guide wheels 14 and longitudinally through a rotating inspection head R which will be related to the operation of other components in more detail hereinafter. As the pipe P emerges from the forward end of the rotating inspection head R, the pipe P passes through the central opening of a magnetic coil 16 which is positioned somewhat beyond the rotating inspection head R. The magnetic coil 16 is customarily supplied with alternating current to consequently form an oscillatory magnetic field in the opening of the coil of sufficient strength to alter the residual magnetism in the pipe P. While the function of the electric coil 16 will become more apparent hereinafter when considered in relation to the other components of the inspection apparatus, it is desirable to apply sufficient alternating current to form a magnetic field of strength adequate to demagnetize ferromagnetic materials of high remanence placed in the opening of the coil so that the coil functions to demagnetize the pipe P.

The forward rack M' supports the longitudinally extending metallic conducting rod C which is mechanically secured to the rack M' by any suitable means at 11 and extends through a front opening 15 of the van V along the locus of the pipe P toward the central opening of the demagnetization coil 16. The member C may be formed of any conducting metal having adequate strength to remain stiff and includes enlargements or washers placed thereon for insulating purposes. As an example, insulating washers made of Teflon which additionally provide a slick surface for ease of engagement are conveniently spaced three to six feet apart to position the conducting member C apart from the inner wall of the pipe P to prevent electrical conduction through the pipe P. The conducting member C is preferably two to four feet greater in length than the pipe P to allow a portion to extend from the pipe P for connection to the rack M' at 11 and to additionally allow a portion to extend from the rearward opening of the pipe P in the van V. As previously mentioned, the drive rollers 12 urge the pipe P forwardly of the van V along the path determined by the guide wheels 13 and 14 through the demagnetization coil 16 and into centralized engagement with the conducting member C so that the pipe P is placed about the conducting member C. An additional pair of drive rollers 18 is provided near the terminus of the conducting member C to urge the pipe P over a set of guide wheels 17 and an additional set of guide wheels 19. The pipe P continues to move forwardly on the front rack M' until the rearward tip of the conducting member C is exposed at which time the pipe rests on the guide wheels 17 and 19 and on the front rack M' with the conducting member C positioned in the central bore thereof.

A pair of hydraulically operated piston and cylinder contacting devices is provided at 20 and includes conductive terminals positioned on the spaced apart ends of the piston rods. The cylinders 20 operate to clamp the conducting member C between the terminals to complete a circuit therewith as described in copending patent application Serial No. 329,084. The circuit completed by operation of the cylinders 20 enables a pulse of unidirectional current to flow through the conducting member C which creates circumferential, residual magnetism in the wall structure of the pipe P which provides maximum intersection of magnetic lines of flux with longitudinally extending flaws to maximize magnetic field variations exterior the pipe P for increased sensitivity and accuracy of inspection. The direction of rotation of the drive rollers 18 is thereafter reversed to move the pipe P rearwardly of the van V through the demagnetization coil 16 and through the rotary inspection head R. No current is applied to the coil 16 so that the pipe P enters the rotary inspection head R having residual magnetism placed circumferentially in the wall structure by the current carried therethrough by the conducting member C and the external magnetic patterns are inspected by the rotary inspection head R. The rotary inspection head is rotated by means to be explained hereinafter and carries internal inspection shoes circumferentially about the outer surface of the pipe P as is more fully described in copending patent Serial No. 346,658. The pipe is urged beyond the rotary inspection head R over the rollers 14 and 13, through the stationary inspection head S, and is driven through the rear opening 10 of the van V by action of the drive rollers 12 which cooperate with the drive rollers 18 to propel the pipe P onto the customary portion of the rear rack M from whence it came. When the pipe P is cleared from the inspection apparatus contained in the van V, the inspection routine is completed for the particular member inspected and the apparatus is in condition for inspection of subsequent members which are inspected in the same way.

While the foregoing describes the inspection apparatus along the locus of the pipe P and relates that portion of the apparatus to the method of this invention, attention is directed to the drive mechanism illustrated in FIG. 7 which operates the inspection apparatus as described more fully in copending patent application Serial No. 348,662. Referring to FIG. 7, the drive mechanism includes a motor and speed reduction assembly housed within the same unit indicated at 25 which drives a shaft 26 which extends forwardly of the van V from the motor and gear mechanism 25. The torque transferred by the shaft 26 is applied to a perpendicular shaft (not shown) through a miter box and the perpendicular shaft connects to the back side of a speed reducer assembly 27 which has a main drive shaft 28 extending therethrough. The drive shaft 28 extends longitudinally of the apparatus and each end terminates in cooperative engagement with identical miter boxes 30. Each miter box 30 rotates downwardly extending drive shafts 31 which include universal joints 32 and lower drive shaft portions 31a which connect to the drive rollers 12 and 18. The pairs of drive rollers 12 and 18 are correlated to provide equal tangential velocities for urging the pipe P through the apparatus of this invention by operating both sets of drive rollers 12 and 18 from the drive shaft 28 which serves as a common source of energy. In the preferred embodiment, the drive shaft 28 transfers torque through the miter boxes 30, the shafts 31, and to the inboard drive rollers of each pair designated at 12 and 18. The mating rollers in contact diametrically opposite the pipe P are driven at equal and opposite velocities by cooperation of spur gears 33 mounted on the shafts 31 which mate with identical gears positioned on identical drive shafts connected to the outboard drive rollers adjacent the outer wall of the van V.

The rotary inspection head R performs no inspection when the pipe P is moved forwardly through the vehicle V but operates when the pipe P is moved rearwardly by the drive mechanism operating through the rollers 18 and 12 when means for rotating the inspection sensors about the pipe P carry the inspection sensors helically relative to the surface of the pipe P. Rotation of the rotary inspection head R is achieved by connecting the rotary assembly to the drive mechanism by a link chain 36 which is driven by the shaft 26. A one way clutch 37 is positioned on the shaft 26 and carries a set of sprocket teeth on the outer surface which engages the chain 36 and the rotary inspection head R includes a drive sprocket 38 at one end thereof and is rotated to spin the rotary assembly R. The one way clutch 37 rotates the inspection head R when the pipe P is moving from engagement with the conducting member C after residual circumferential magnetism has been formed in the wall structure for inspection and slips when the shaft 26 is rotated in the opposite direction which is associated with rotation of the drive rollers 12 and 18 in the opposite direction to move the pipe P forwardly of the van V through the inspection apparatus preliminary to the formation of the residual circumferential flux.

The motion of the pipe P is directed by operation of the control circuitry shown schematically in FIG. 8 which is actuated by various switches placed along the locus of the pipe P as it moves along the racks M and M' and through the inspection apparatus in the van V. The switches referred to are electrical switches having rotatable, bumper wheels mounted on lever arms for engagement with the pipe P as the pipe P moves past the switches. The switches are positioned so that the pipe P presses against the bumper wheel to move the wheel and actuate the lever to alter the electrical connection of the switch in accordance with the control circuitry connected thereto. Considering the location of the switches, one such switch 41 is positioned in the rack M and is actuated when the pipe P is placed on the rack M. An additional switch 42 is placed immediately inside the van V from the rear opening 10 and a similar switch 43 is placed at the same location on the opposite side of the pathway of the pipe P. It is to be noted that the switches 42 and 43 may conveniently share the same bumper wheel which results in simultaneous actuation of each switch or, the switch 42 may be provided with a multiplicity of terminals to accomplish the functions of both switches 42 and 43. A similar switch 44 is provided between the demagnetization coil 16 and the hydraulic cylinder arrangement 20 with its bumper wheel 44a located just beneath the rearward tip of the conducting member C. A pipe actuated switch 45 is positioned forward of the hydraulic cylinder arrangement 20 with its bumper wheel positioned just to the rear of the forward drive rollers 18. And a switch 46 is positioned forwardly in the front rack M' to detect the presence of the pipe P on the rack.

FIG. 8 discloses control circuitry which shows that the switches 42 and 44 cooperate to control forward motion of the pipe P while the switches 43 and 45 cooperate to control the rearward motion of the pipe P after the residual magnetism has been formed by operation of the surge of current flowing through the conducting member C. A source 50 provides electrical power at 110 volts A.C. and is connected to the wiper arm of a switch 51 which has three terminals. One terminal 51a is designated the forward terminal and a wire 52 is connected to the terminal and extends to a ganged switch mechanism 54. The ganged switch 54 routes the signal on the wire 52 to a wire 55 which is connected to both the switches 42 and 44. On actuation of either switch 42 or switch 44, electrical power is applied to the winding 56a of a relay 56 and actuates the contacts 56b to operate the main drive motor 25a which is contained in the motor and gear housing 25. The relay 56 includes four sets of contacts which are connected to the field and armature portions of the motor 25a so that electrical power is applied to the motor 25a through two of the contacts and return circuitry is provided to ground through the remaining two contacts with the electrical connections made to rotate the motor 25a so that the drive rollers 12 and 18 drive the pipe P forwardly of the van V. Actuation of the three position switch 51 to the forward terminal whereby the terminal 51a is connected to the power source additionally applies voltage through the wire 58 and to the switch 41. When the pipe P is placed on the rear rack M, the pipe P presses the sensing wheel of the switch 41 down to move the lever and close the switch to apply voltage through the wire 58 to a relay 59 having a winding 59a and contact portion 59b. Operation of the relay 59 by application of voltage to the winding 59a closes the contacts of the armature portion 59b to make electrical connections completing circuitry for applying electrical power to the rear drive motor T. The terminals of the contact portion of the relay 59 are connected to apply electrical voltage to the rear drive motor T and to also create a ground return path such that the motor T rotates in the proper direction to move the pipe P forwardly of the rear rack M.

The rear drive motor T and the main drive motor 25a urge the pipe P forwardly through the inspection apparatus in the van V until the leading edge of the pipe P contacts the switch 46 and depresses the bumper wheel to actuate the switch and complete connection of a wire 60 extending from the terminal 51a through the switch 46 to a relay 61. When the winding portion 61a is actuated, the terminals 61b are closed to form four electrical connections to voltage to and complete a ground for the field and armature windings of the front drive motor T'. Thus, the front drive motor T' is actuated to move the pipe P forwardly on the front rack M'. If desired, a switch 62 in the wire 60 may be opened to prevent operation of the motor T' when the main drive motor 25a furnishes adequate thrust for the pipe by operation of the drive rollers 18.

When the pipe P moves forwardly of the inspection apparatus within the van V so that the switches 42 and 44 are disengaged from the lower surface of the pipe P and returned to the open positions, the relay 56 is deactivated to stop the main drive motor 25a for the pipe P is advanced sufficiently of the conducting member C to expose the tip of the conducting member opposite the hydraulic cylinders 20 to allow the hydraulic cylinders 20 to clamp the conducting member C to complete a circuit therewith without physical interference of the pipe P. The switch 51 is actuated to the central position to remove electrical power from the terminal 51a and the switch 54 is operated to apply electrical power to the terminal 54a and to a wire 65 which connects to a solenoid valve 66 for controlling the flow of pressure fluid to the hydraulic cylinder devices 20. Extension of the piston rods of the cylinders 20 contacts conducting terminals against the member C to complete a circuit therebetween which is indicated in FIG. 8 schematically as the switch 67 which is mechanically actuated by the solenoid valve 66. Once the switch 67 is closed to complete a path to ground for the conducting member C, a circuit means 68 for forming a surge of current is prepared for operation and is actuated by momentarily depressing the push-button switch 69. The push-button switch 69 operates the magnetizing circuit 68 to discharge a pulse of current of the proper amplitude and shape which flows through the conducting member C to form circumferential flux about the member C which is concentrated within the walls of the pipe P and retained as residual magnetism having the proper density for subsequent inspection. Operation of the magnetizing circuit 68 is fully described in copending patent application Serial No. 325,064, now Patent No. 3,255,381. After the magnetizing circuit 68 has functioned to flow current through the conducting member C to subsequently magnetize the wall structure of the pipe P, the switch 54 is operated to disconnect voltage from the terminal 54a which causes the solenoid valve 66 to operate the hydraulic cylinders 20 and open the switch indicated schematically at 67 to clear the pathway of the pipe P for movement in the reverse direction.

Movement in the reverse direction is accomplished by operating the switch 51 to apply power to the terminal 51b which is connected through the switch 54 to switches 43 and 45. The switch 45 is maintained in a depressed state because the pipe P was advanced forwardly of the connecting member C just beyond the hydraulic cylinders 20 by the main drive motor 25a, and after the electromagnetic means functions to magnetize the pipe P with circumferential flux, operation of the switch 54 applies electrical power through the switch 45 to actuate the main drive motor 25a in the opposite direction to rotate the drive rollers 12 and 18 to move the pipe P rearwardly of the vehicle V. However, a group of microswitches is interposed in series between the switch 45 and the reverse direction relay 72 to ascertain the status of inspection sensors in the stationary inspection head S. Since the stationary inspection head S funtions when the pipe P is moving forwardly of the vehicle V, it serves no useful purpose to maintain the inspection sensors in contact with the outer surface of the pipe P during rearward motion so that a wire 73 is connected to the terminal 51b to apply voltage to the winding 74a of a relay 74 to close a contact 74b to operate a group of solenoids which are each designated at 75 to lift the inspection sensors from the outer surface of the pipe P. Operation of each of the solenoids 75 mechanically closes an associated microswitch 77 as is described in copending patent application Serial No. 348,047. The switches 77 are serially connected between the switch 45 and the winding 72a of the relay 72, and it may be appreciated that an electrical signal is applied to operate the winding 72a when all the aforementioned switches are properly closed resulting in closure of four sets of contacts 72b of the relay 72 to apply voltage to and complete ground circuits for the field and armature winding of the main drive motor 25a to obtain reverse rotation of the drive rollers 12 and 18.

Operation of the switch 51 to energize the terminal 51b applies electrical power through a wire 80 which is connected to a second set of contacts 46a of the switch 46 for energization of a reverse direction relay 81. When the winding 81 is operated, the four sets of contacts 81b are made to complete circuitry energizing the armature and field winding of the front drive motor T' for operation in the opposite direction so long as the switch 46 is pressed downwardly by the pipe P.

The rearward motion of the pipe P through the inspection apparatus of the van V carries the pipe P through the rearward drive rollers 12 and into contact with the bumper wheel of the switch 41 which is positioned in the rack M to actuate the switch 41. A wire 84 is connected from the terminal 51b to the switch 41 so that closure of the switch 41 applies voltage to the winding 85a of a relay 85. The relay 85 includes terminals 85b which apply voltages to and complete ground circuits for the field and armature windings of the rear drive motor T to provide motive force for translating the pipe P rearwardly of the rack M.

While the foregoing describes operation of the control circuitry associated with the apparatus of this invention which automatically feeds the pipe P through the inspection apparatus, other functions are accomplished by circuitry shown schematically in FIG. 8. Operation of the switch 51 to apply voltage to the terminal 51a operates through a wire 86 to energize the winding portion 87a of a relay 87 and close the contacts 87b. The terminals 87b apply voltage from the source 50 through a wire 88 to operate each of a pair of solenoids 89 which mechanically lifts the inspection sensors in the rotating inspection assembly R as described in copending patent application Serial No. 346,658. The rotating inspection sensors are lifted from the outer surface of the pipe P as the pipe P moves forwardly through the van V to reduce friction and wear on the inspection sensors since inspection is accomplished during rearward movement after the pipe P has induced therein residual circumferential magnetism formed by the magnetizing circuit 68 which pulses the conducting member C with a surge of current. Movement of the switch 51 to contact the terminal 51a coupled with operation of either switch 42 or switch 44 applies voltage through a wire 90 which energizes the winding portion 91a of relay 91. The winding 91a closes the terminals 91b to apply voltage through a wire 92 to the demagnetization coil 16 which is represented schematically in FIG. 8 as a coil placed on an iron core. Additionally, operation of the relay 91 applies voltage to a D.C. power supply 94 which forms unidirectional current which is supplied to a pair of coils 95 which are mounted in the stationary inspection head S to form longitudinally extending magnetic lines in a substantial portion of the length of the pipe P. Each of the coils 95 is represented schematically in FIG. 8 as being wound on an iron core which, of course, includes the ferromagnetic tubular member which is positioned in the opening of the coils 95.

Since inspection is accomplished on both the forward and rearward passes of the pipe P through the apparatus, it may be appreciated that the main drive motor 25a provides a ground for a chart drive mechanism 96 which forms a visible and preferably permanent record of the data sensed by the inspection sensors during inspection. A switch 97 is connected to the voltage source 50 and operates to apply drive voltage to the chart drive mechanism 96 through a wire 98. The ground return wire 99 is connected to the ground side of the armature of the main drive motor 25a so that when either relay 56 or relay 72 applies voltage to the motor 25a for rotation in either direction, the operative relay provides a path to ground for the chart drive mechanism 96 which then operates to record data detected by the inspection sensors. Coupling the operation of the chart drive 96 to the main drive motor 25a limits operation of the chart drive to those times when some portion of the pipe P is within the vehicle V and contacting one of the four bumper switches 42, 43, 44, or 45.

The chart drive mechanism 96 is any conventional means forming an indication to enable the operator of the apparatus of this invention to examine and evaluate the signals formed on the chart for indications of voids, flaws, seams, and other structural anomalies. Because the preferred embodiment of the rotary inspection head R includes two sensors, the chart drive preferably includes two or more recording channels so that both sensors of the rotary inspection head R may be connected to individual indication means while apparatus is associated with the chart drive 96 for connecting the sensors of the stationary inspection assembly S to the two channels of the chart drive mechanism 96. The sensors in the rotary inspection head are represented generally schematically at 100 and the sensors of the stationary inspection head S are represented generally schematically at 101. The output signals of both sets of sensors are connected through the relay 102 having a winding 102a which is connected by a wire 103 to the terminal 51a whereby operation of the switch 51 to the forward position forms an electrical signal which closes the contacts 102b of the relay 102 to connect the stationary sensors represented generally at 101 through conductive means 105 for further operation. The conductive means 105 is connected to a selector and amplifier unit 108 which, as described in copending patent application Serial No. 402,551, selects two maximum signals instantaneously present among the eight signals provided by the stationary sensors 101 and amplifies the signals to a level sufficient to operate the recording apparatus of the chart drive mechanism 96 and form traces or indications for evaluation. Conversely, when the switch 51 is operated to the reverse terminal 51b, voltage is removed from the winding 102a of the relay 102, and the terminals 102b connect the rotary sensors 100 to the selector and amplifier circuit 108 where the signals indicative of flaws are amplified and applied to the two channel indicating equipment of the chart drive mechanism 96. It is to be noted that while the preferred embodiment utilizes the selector and amplifier circuit 108 to connect the two rotary sensors 100 and the eight stationary sensors 101 of the preferred embodiment to the dual recording apparatus of the chart drive mechanism 96, the number of sensors in either unit may be varied in any particular situation, and if the number of sensors in the units is not equal, the selector circuitry of the circuit 108 functions to provide an identical number of output signals from each inspection head to the chart drive mechanism 96 to reduce the profusion of data without sacrificing the critical data indicative of a flaw or other structural anomaly.

The floor plan of the van V is illustrated in FIG. 6 to relate the location of the apparatus of this invention to the vehicle and illustrating the all weather protection provided for the apparatus. For instance, a compartment is provided at 110 for the engine in the forward portion of the vehicle to allow open floor space adjacent the inspection apparatus for each of access by the operator of the apparatus. Additionally, the circuitry of FIG. 8 is preferably operated by switches located at or on the console unit 111 which is positioned against the left wall of the van and the chart drive mechanism 96 is mounted on the inboard side of the console 111 to enable the operator to manipulate switches such as the switches 51 and 69 while viewing the indicated results displayed by the chart drive mechanism 96. The vehicle V preferably includes a self-contained power generation system located in the compartment 112 at the rear left wall of the vehicle to generate adequate electrical power for operation of the apparatus. A compartment 113 is provided forward of the compartment 112 for receiving any commercially available pressurization unit for supplying pressure fluid to pressure operated apparatus such as the hydraulic cylinders 20 which respond to application of pressure fluid.

The front and rear racks M and M' preferably include universal pipe centering means for positioning the pipe or other tubular members centrally on the racks independently of the diameter of the tubular members and such means may be comprised of guide wheels such as those located in the van V. The wheels 13 include chamfered surfaces adjacent one another at the outer circumference which provide variable contact with the outer perimeter of a cylindrical object such as the pipe P to maintain the axis of the cylindrical object therebetween. The rear rack M is supported in horizontal alignment with the rear opening 10 of the van V by two sets of support legs which additionally provide storage means for a plurality of elongate members which are sequentially fed to the rack M by pipe ejectors positioned between the rails of the rack M. The support of the rack M on the driver's side of the vehicle M is provided by a pair of spaced apart perpendicularly extending legs 115 which are inclined downwardly toward the rack M from their outer ends 115a to permit gravity feed of any number of elongate members resting thereon. The support legs 116 on the opposite side of the rack M slope downwardly from the side of the rack M to move by gravity inspected elongate objects toward the outer terminus of the rack leg assemblies 116 after clearing the rack M as a step of the inspection sequence. Pipe ejectors, such as those described in copending patent application Serial No. 360,898, now Patent No. 3,250,404 are positioned between the side braces of the rack M at two or three locations along the length of the rack M to lift the elongate member resting on the legt assemblies 115 onto the rack M and to simultaneously eject any pipe resting on the rack M after completion of the prior inspection operation toward the lower support leg assemblies 116.

The front and rear racks M' and M are formed of the longitudinally extending side braces 117 spaced apart from one another by suitable cross framing members such as the frame member 117a illustrated at the ends of the racks M and M'. Both the racks M and M' are preferably comprised of a plurality of shorter portions of side braces 117 to enable the racks to be dismantled and stored in the van V for transportation and the resulting increased mobility. Each of the side frame sections is preferably identical and includes the pair of side frame members 117, appropriate cross bracings therebetween, and the means for supporting the pipe P such as the chamfered wheels 13 which are similar to the guide wheels 14, 17, and 19 found in the vehicle V along the locus of the elongate members. The sections of the racks, while being structurally identical, carry thereon other apparatus mounted in a conventional and well-known manner such as the front and rear drive motors T' and T, respectively. Also, trunk latch mechanisms are preferably included on the side members 117 to provide means for securing the pipe ejector mechanisms to the members 117 as described in copending patent application Serial No. 360,898 now Patent No. 3,250,404.

The forward rack M' is provided with identical support leg assemblies 118 on both sides of the rack M' to position the rack horizontally in line with the front opening 15 of the vehicle V so that continuous horizontal support is provided for the locus of the pipe P as it travels from the rear rack M to the front rack M' and is positioned thereon as illustrated in FIG. 2. As will be understood from operation of the apparatus, the front rack M' includes between the rails thereof at two or three locations right and left-handed pipe ejectors similar to the ejectors installed on the rear rack M and described in copending patent application Serial No. 360,898 now Patent No. 3,250,404 for ejecting pipe to the left or to the right onto the upper edges of the support leg assemblies 118. The support leg assemblies 118 slope downwardly from the forward rack M' to provide gravity feed for storage of pipe ejected from the front rack M'. The left- and right-handed ejectors are individually actuated in groups to support the pipe P after ejection when the pipe P rests on the front rack M'.

The support leg assemblies 115, 116, and 118 are preferably bolted or attached by other releasable means to the racks M and M' to form releasable connections therewith to enable the support leg assemblies to be disconnected from the racks and stored in the van V when the inspection apparatus of this invention is transported from field location to location. Additionally, the metallic conducting member C may be formed of sections of pipe of appropriate lengths to enable the conducting member to be dismantled or otherwise shortened to fit in the vehicle V when not in use.

The length of the front and rear racks M' and M and the length of the conducting members C are related to the length of the members to be inspected. For instance, if it is desired to inspect oil field tubing or the like, such tubing comes in standard thirty foot lengths so that the support leg assemblies 115 and 116 of the rear rack M should be less than thirty feet apart to provide support for a plurality of members before and after inspection, and the same is true of the support leg assemblies 118 attached to the front rack M'. The conducting members C should exceed the length of the member to be inspected, as previously mentioned, to enable the rearward terminus of the member to be exposed for contact by the hydraulic cylinders 20 and to enable the forward tip of the member to be attached to the front rack M' at 11. For use with the above mentioned oil field members and tubings, the racks M and M' are preferably thirty-two feet long to accommodate the oil field tubular members of a standard thirty foot length and the racks M and M' are preferably formed of identical sections eight feet in length which may be assembled and disassembled for storage in the vehicle V.

While the foregoing describes the apparatus of this invention, to further expand and amplify and to additionally describe the method of the invention, the operation of the apparatus will be related to an inspection sequence utilizing the schematic representations of the apparatus included in FIGS. 3, 4, and 5 to thereby relate the method of inspection to the apparatus. The apparatus is illustrated somewhat schematically in FIGS. 3, 4, and 5 to provide clarity in understanding and the various components are shaded when in use as a means of distinguishing the various steps of inspection.

The pipe P is represented in FIG. 3 as advancing forwardly of the apparatus propelled by the drive rollers 12 and is moved in proximity of the magnetizing coils 95 included in the stationary inspection head S for inspection by the sensors contained therein, the sensors being represented schematically at 101. The encircling coils 95 operate to form along the longitudinally extending flux represented by the group of arrows 119 and a hypothetical flaw 120 is illustrated as interrupting the magnetic field represented by the deviation of direction of the arrows at 119. The flaw 120 is illustrated relative to the stationary inspection sensors 101 since indications might be recorded therein to thereby indicate the structural integrity of the elongate member P. While the flaw is illustrated as interrupting the parallel arrangement of the magnetic flux in the plane of the drawing, it may be appreciated by those skilled in the art that there is additionally a magnetic field interruption caused by the hypothetical flaw 120 which extends through the magnetic field in all directions thereabout and more particularly, magnetic field variations extend from the flaw 120 exterior the outer surface of the pipe P so that detector means 101 may intercept the variations to form an electrical signal on movement of the variations therepast for recording by the chart drive mechanism 96 as an indication to the operator of the apparatus. Since the drive rollers 12 provide continuous motion to the pipe P longitudinally of the apparatus, relative motion is developed between the magnetic field variations indicative of the flaw 120 and the detector means 101 to continuously move the pipe P and any magnetic field variations past the detector means 101 so that the detector means 101 responds to the magnetic lines of flux to form a variable signal related to the variation in the magnetic field exterior the full length of the pipe P.

The magnetic filed formed by the operation of the coils 95 illustrated in FIG. 3 is an active magnetic field which tends to impart residual magnetism to each portion of the pipe P, assuming its remanence is high, as it is moved longitudinally past the coils so that the pipe P is preferably demagnetized preparatory to the formation of a magnetic field circumferentially within the wall structure of the pipe P. Considering a small element having high remanence of the pipe P such as the incremental square indicated at 125, the drive rollers 12 urge the incremental square 125 forward towards the oscillatory magnetic flux surrounding the coil 16 which is energized with an alternating current forming the oscillatory magnetic field which acts on the incremental square 124 with increasing amplitude. The incremental element 125 is subjected to the oscillatory magnetic field which increases in amplitude relative to the element 125 so that the residual magnetism left by operation of the magnetic coils 95 is destroyed by the changing orientation of the magnetic domains of the pipe P, and of note is the fact that the demagnetization coil 16 itself leaves no residual magnetism as the incremental portion 125 moves longitudinally of the inspection apparatus past the demagnetization coil with the result that the pipe P is demagnetized along its full length by operation of the coil 16 acting on all portions thereof after the pipe P has completely passed through the demagnetization coil 16 and the influence of its oscillatory magnetic field. Such movement carries the pipe P into contact with the front drive rollers 18 which assist the rear drive rollers 12 in urging the pipe P toward the forwardmost position on the apparatus whereby the rearward opening of the pipe P is forward of the rearward tip of the conducting member C as is illustrated in FIG. 4.

FIG. 4 further exemplifies the method of this invention and illustrates the step wherein current is flowed axially through the tubular member to form circumferential flux in the wall structure for subsequent inspection. Relating this step to the apparatus, the hydraulic cylinders 20 are operated to extend their piston rods toward the conducting member C and they carry at their outer ends terminals made of conducting material which are connected to a wire (not shown) to complete a circuit after contact with the conducting member C, which connection is schematically represented in FIG. 8 as the swith 67. Current is flowed axially of the conducting member C as represented by the arrow 130 wherein said current flow forms circumferential magnetic flux indicated by a set of arrows 131. While the arrows 131 of FIG. 4 are drawn at one portion of the pipe P, they are representative of the magnetic flux formed throughout the full length of the pipe P by the current flow in the conducting member C.

The drive rollers 18 and 12 are rotated in the directions indicated in FIG. 5 to advance the pipe P towards the rotating inspection sensors 100 after the hydraulic cylinders 20 are operated to clear the pathway through the apparatus. A longitudinally extending flaw 132 is represented pictorially in FIG. 5, and the circumferential magnetic lines of flux 131 are illustrated in the plane of the drawing as being interrupted by the flaw 132 and extending around the ends of the flaw. While difficult to illustrate, it may be appreciated that the circumferential magnetic lines of flux represented by the group of arrows 131 also form magnetic field variations beyond the outer surface of the pipe P and are intersected by the detector means 100 which are moved helically about the pipe P having components of motion which are resolved along the axis of the pipe P to accomplish inspection of the full length of the specimen and motion circumferentially about the pipe P to carry the detecting elements of the means 100 toward the longitudinally extending flaw 132 to intersect the greater dimension of the magnetic field disturbances created by the structural anomaly 132 in the pipe P. The drive rollers 12 and 18 translate the full length of the pipe P past the rotating sensors 100 to accomplish total inspection of the full length of the pipe P and other apparatus of the invention subsequently removes the pipe P from the inspection apparatus shown in the drawings which is placed in ready condition for performing the inspection sequence when additional tubular members are subsequently translated through the apparatus as illustrated in FIG. 3.

An alternative method of inspection may be accomplished with the apparatus of this invention and is particularly adapted for inspection of used tubular members. Used tubular members may be characterized as those which, through usage which subjects the structure to stresses and vibrations, undergo the possibility of forming structural flaws and fissures which consistently extend circumferentially of the structure. Thus, if a particular tubular member is installed when new and used in some conventional manner in oil field operations, it may be safely predicted that any flaws developed during usage which require rejection of the particular member as unfit for further operations will extend across the member P so that inspection by the stationary inspection head S is sufficient to qualify the member for subsequent use.

Considering the pipe P in FIG. 3 as a used tubular member generally susceptible of circumferentially extending flaws, the pipe is advanced through the apparatus of this invention by the drive rollers 12 and passes through the central openings of the coils 95. The coils 95 form magnetic flux extending longitudinally through a portion of the pipe P as indicated by the arrows 119 of FIG. 3 and the detector means 101 senses magnetic field variations indicative of the flaw exemplary 120 in the same manner as set forth hereinbefore. However, used pipe is inspected by the apparatus of this invention as illustrated in FIG. 3 and as previously described with the exception that the conducting member C is removed from the front rack M' to permit the pipe P to advance forwardly of the apparatus through the drive rollers 18. The sequence of operations illustrated in FIGS. 4 and 5 is not utilized when inspecting used tubular members and the direction of the motion of the pipe P need not be reversed to return the pipe P to the rear rack M. Since the conducting member C is removed during inspection of used members, the front pipe rack M' may be used for storage of inspected members to enable the pipe drive mechanism to perform inspection during one pass of each pipe through the apparatus to thereby enable more rapid inspection of a plurality of used members. According to the results provided by the indicating means and interpretation attached thereto by the operator of the apparatus, the right and left-hand ejectors mounted between the rails of the front rack M' may be operated to eject structurally sound used members to one side of the rack M' whereas rejected members are ejected to the opposite side and are consequently sorted from the structurally sound members.

The apparatus for practicing the method of this invention is portable and may be assembled and disassembled at field locations during inspection of a plurality of elongate members. On arrival at a remote location such as the drilling site of an oil well, the van V is parked, and the van doors are opened for removal of the equipment stored in the van. Room for storage in the van is provided on the floor adjacent the inspection apparatus and is sufficient to store the forward and rear pipe racks M' and M in a disassembled condition. As previously mentioned in connection with the exemplary inspection of elongate members thirty feet in length, the racks M and M' are formed of four sections each of side frame members 117 which are structurally identical. The drive motors T and T' are connected in a conventional manner, and the pipe ejector mechanisms are attached by trunk latches as described in copending patent application Serial No. 360,898 now Patent No. 3,250,404. The support leg assemblies 115, 116, and 118 are removed from the van V and connected to the front and rear rack means M' and M, respectively, to provide the longitudinally extending support means for the elongate members as illustrated in FIGS. 1 and 2. The conducting member C is connected to the forward rack M' at 11 and assembled from various sections to extend the desired length relative to the elongate members to be inspected when connected to the magnetizing circuit 68 to communicate electrically therewith to flow pulsed unidirectional current through the pipe P to form circumferential flux in the walls thereof. It is to be noted that the apparatus is assembled in the same manner for the inspection of both new and used tubular members with the exception that the conducting member C is omitted when inspecting used members.

Broadly, this invention relates to a method of inspecting a plurality of elongate members for structural flaws and apparatus for practicing the method thereof.

What is claimed is:
1. A mobile pipe inspection device comprising:
   (a) a vehicle having an interior portion providing all weather protection therein, there being an opening to the exterior of the vehicle,
   (b) rack means aligned with the opening for receiving pipe thereon,
   (c) means for translating pipe on the rack means into the interior portion of the vehicle,
   (d) means in the vehicle for magnetizing a substantial longitudinal portion of the pipe,
   (e) means in the vehicle for sensing magnetic field variations adjacent the outer surface of the pipe,
   (f) means in the vehicle for indicating magnetic field variations sensed by the sensing means,
   (g) means for circumferentially magnetizing the pipe,
   (h) means in the vehicle for sensing magnetic field variations adjacent the outer surface of the circumferentially magnetized pipe, said means being connected to the indicating means for indicating variations detected thereby, and
   (i) means for translating inspected pipe from the interior portion of the vehicle.
2. The invention of claim 1 including demagnetizing means which demagnetize the pipe prior to circumferential magnetization.

References Cited by the Examiner

UNITED STATES PATENTS

| | | | |
|---|---|---|---|
| 2,242,366 | 5/1941 | Muller | 324—38 |
| 2,308,159 | 1/1943 | Drummond et al. | 324—37 |
| 2,989,692 | 6/1961 | Price et al. | 324—37 |
| 2,995,701 | 8/1961 | Lloyd | 324—37 |

FOREIGN PATENTS 1,060,626   7/1959   Germany.

OTHER REFERENCES

Hird, F. S.: Wire Splice Detector, Electronics, September 1945, pp. 98–99.

Non Destructive Testing Handbook by McMaster, The Ronald Press, New York, 1963, vol. II, pp. 30.5, 30.6, 30.7, 30.8, 30.9, 30.11, 30.12, 30.21, 30.22, 30.23.

WALTER L. CARLSON, *Primary Examiner.*

RICHARD B. WILKINSON, *Examiner.*

R. J. CORCORAN, *Assistant Examiner.*